(12) United States Patent
Parker, III et al.

(10) Patent No.: US 8,332,440 B2
(45) Date of Patent: Dec. 11, 2012

(54) AUTOMATICALLY CREATING DATA HIERARCHY IN CRM APPLICATIONS BASED ON IMPORTED CONTACT DATA

(75) Inventors: Wayne Parker, III, Seattle, WA (US); Craig Austin, Seattle, WA (US); Nick Thomson, Redmond, WA (US); Praveen Upadhyay, Bellevue, WA (US); Ian Legler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 111 days.

(21) Appl. No.: 12/908,530

(22) Filed: Oct. 20, 2010

(65) Prior Publication Data

US 2012/0102036 A1    Apr. 26, 2012

(51) Int. Cl.
 *G06F 17/30* (2006.01)
(52) U.S. Cl. ........................................ 707/803
(58) Field of Classification Search ........... 707/2, 104.1, 707/618, 206, 803; 715/748
See application file for complete search history.

(56) References Cited

U.S. PATENT DOCUMENTS

| | | | |
|---|---|---|---|
| 7,269,605 B1 | 9/2007 | Nguyen et al. | |
| 2002/0184199 A1 | 12/2002 | Celik | |
| 2006/0167942 A1* | 7/2006 | Lucas et al. | 707/104.1 |
| 2008/0243967 A1* | 10/2008 | Bhatia et al. | 707/206 |
| 2008/0313154 A1 | 12/2008 | Wallis et al. | |
| 2010/0063959 A1* | 3/2010 | Doshi et al. | 707/618 |
| 2010/0064231 A1* | 3/2010 | Gupta | 715/748 |
| 2010/0306086 A1* | 12/2010 | Fox Davies | 705/30 |

OTHER PUBLICATIONS

"Ability to Customize Account Hierarchy View", Retrieved at << http://sites.force.com/ideaexchange/ideaView?c=09a30000000D9xt&id=08730000000BrbBAAS >>, Jan. 25, 2007, pp. 6.
"Chaos software", Retrieved at << http://www.chaossoftware.com/ >>, Sep. 27, 2010, pp. 3.
"Business Contact Manager", Retrieved at << http://www.avidian.com/business-contact-manager/bus-con-mngr.aspx >>, Sep. 27, 2010, pp. 2.
"Batchbook Small Business CRM & Contact Management Software", Retrieved at << http://salesmarks.com/batchbook-small-business-crm-contact-management-software/ >>, Sep. 27, 2010, pp. 3.
"Sugar Enterprise 6.0 Documentation", Retrieved at << http://www.sugarcrm.com/crm/support/documentation/SugarEnterprise/6.0/-docs-Application_Guides-Sugar_Enterprise_Application_Guide_6.0RC1-Administration.html >>, Sep. 27, 2010, pp. 53.

* cited by examiner

*Primary Examiner* — Etienne Leroux
(74) *Attorney, Agent, or Firm* — Turk IP Law, LLC (57) ABSTRACT

An automated contact import module enables users to select groups of contacts to import from an email, contact management, scheduling (ECS) application based on viewing contacts by category, organization, email domain, and similar attributes. Contacts in selected groups are imported to a CRM application with automatic data mapping. Communication history may be part of the import process by searching previously indexed emails, appointments, and comparable data associated with the selected contacts effectively creating a data hierarchy at the CRM application.

20 Claims, 7 Drawing Sheets

AUTOMATICALLY CREATING DATA HIERARCHY IN CRM APPLICATIONS BASED ON IMPORTED CONTACT DATA

BACKGROUND

Customer Relationship Management (CRM) solutions provide tools and capabilities needed to create and maintain a clear picture of customers, from first contact through purchase and post-sales. For complex organizations, a CRM system may provide features and capabilities to help improve the way sales and marketing organizations target new customers, manage marketing campaigns, and drive sales activities. CRM systems may include many components, hardware and software, utilized individually or in a shared manner by users internal or external to the organization.

CRM systems are an example of computing systems where data associated with entities such as persons, organizations, accounts, and similar ones are maintained for various purposes. Some of the information, like contact information, collected and maintained by CRM applications may also be collected by other common applications such as email, contact, and/or scheduling applications (for example, Outlook® by Microsoft Corporation of Redmond, Wash.). While other applications have object based or comparable structures for contacts and similar data, CRM applications typically employ hierarchical data structures, where the data is associated with accounts. Thus, conventional approaches to importing contact data to CRM applications include a significant amount of manual operations that involve importing different types of data such as communication history along with contact data, creation of hierarchies, connections with accounts, and so on.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling users to select groups of contacts to import from an email, contact management, scheduling (ECS) application based on viewing contacts by category, organization, email domain, and similar attributes. Contacts in selected groups may be imported to a CRM application with automatic data mapping. According to some embodiments, communication history may be part of the import process by searching previously indexed emails, appointments, and comparable data associated with the selected contacts effectively creating a data hierarchy at the CRM application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, contacts in selected groups may be imported from an ECS application to a CRM application with automatic data mapping by enabling users to select groups of contacts and attributes such as category, organization, email domain, and comparable properties to import. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing CRM and/or email, contact, scheduling based services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

The combined term ECS application is used herein to collectively describe hosted and/or local applications that provide email, scheduling, contact management, calendaring, and similar services. An example of such applications is Outlook® by Microsoft Corp. of Redmond, Wash. Such applications may provide one or more of the above listed functionality through a number of user interfaces. They may be executed on a server as a hosted service and accessed by users through thin clients such as browsers or locally executed client applications. Some of the services may be provided online, others may be provided offline. For simplicity, such applications are referred to collectively as ECS applications.

Figure 1:
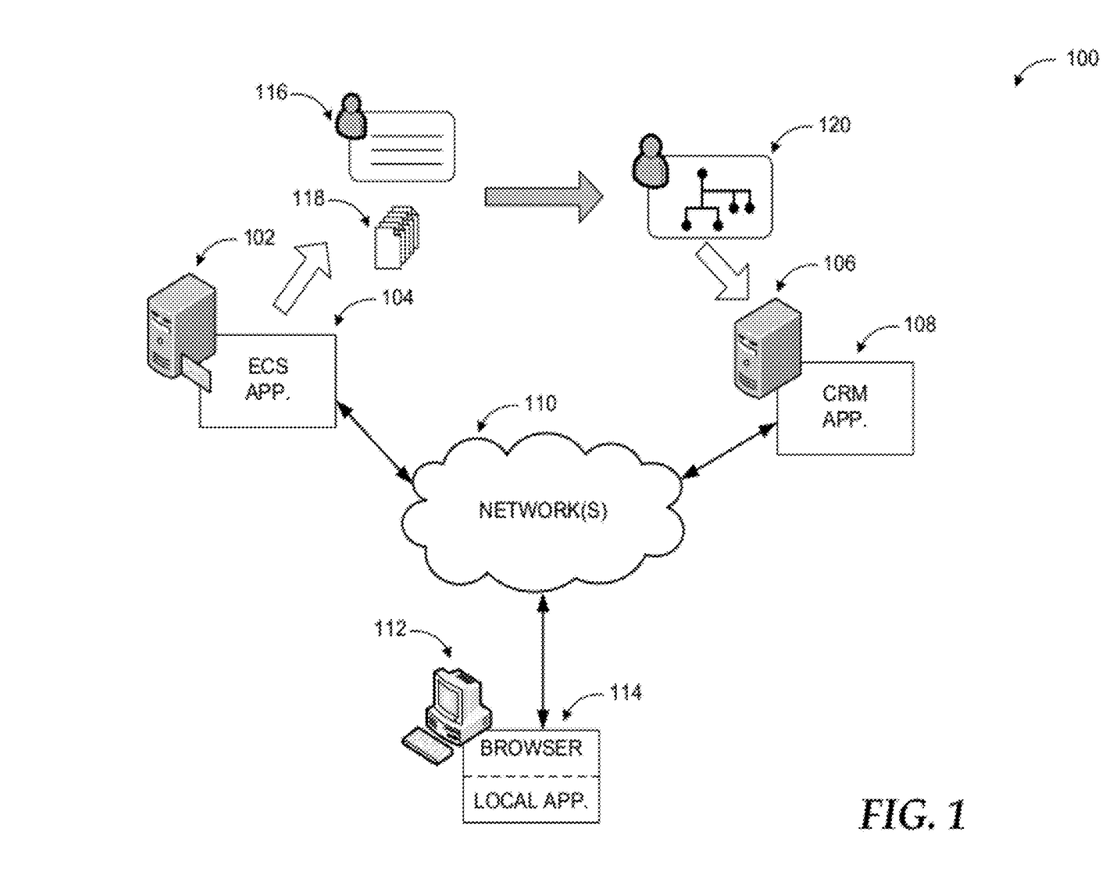
FIG. 1 illustrates a networked environment, where contact information from an ECS application may be imported to a CRM application creating associated data hierarchy at the CRM application according to some embodiments.

Referring to FIG. 1, diagram 100 illustrates a networked environment, where contact information from an ECS application may be imported to a CRM application creating associated data hierarchy at the CRM application according to some embodiments. The computing devices and computing environments shown in diagram 100 are for illustration purposes. Embodiments may be implemented in various local, networked, and similar computing environments employing a variety of computing devices and systems.

In an example environment illustrated in diagram 100, a user may access a CRM application 108 executed on a CRM server 106 through a browser or client application 114 executed on a computing device 112 via network(s) 110. The user may also access email, contact management, and/or scheduling services managed by an ECS application 104 executed on server 102 through the same or different browser or client application 114 executed on the computing device 112 via network(s) 110. Some of the tasks associated with the ECS services may be performed online, while others may be performed offline. In case of dedicated client applications, the client application is sometimes referred to as offline client when it is operating without a connection to the ECS application 104. When the client application is in contact with the ECS application 104, it may be referred to as online client.

Both, ECS application 104 and CRM application 108 may collect and maintain information such as contact information. While the ECS application 104 may employ and object based structure for contact and other information, CRM application 108 is likely to have a data hierarchy, where contact information is associated with accounts.

In a system according to embodiments, contact data 116 and optionally associated data 118 (e.g., communication history comprising emails, appointments, instant message exchanges, faxes, etc.) may be imported from ECS application 104 to CRM application 108 by enabling users to select contacts based on category, organization, email domain, etc., which allows the system to create data hierarchy on the CRM side based on the groupings. Automatic data mapping may be customizable by users. The end result is hierarchically created CRM contact data 120.

Figure 2:
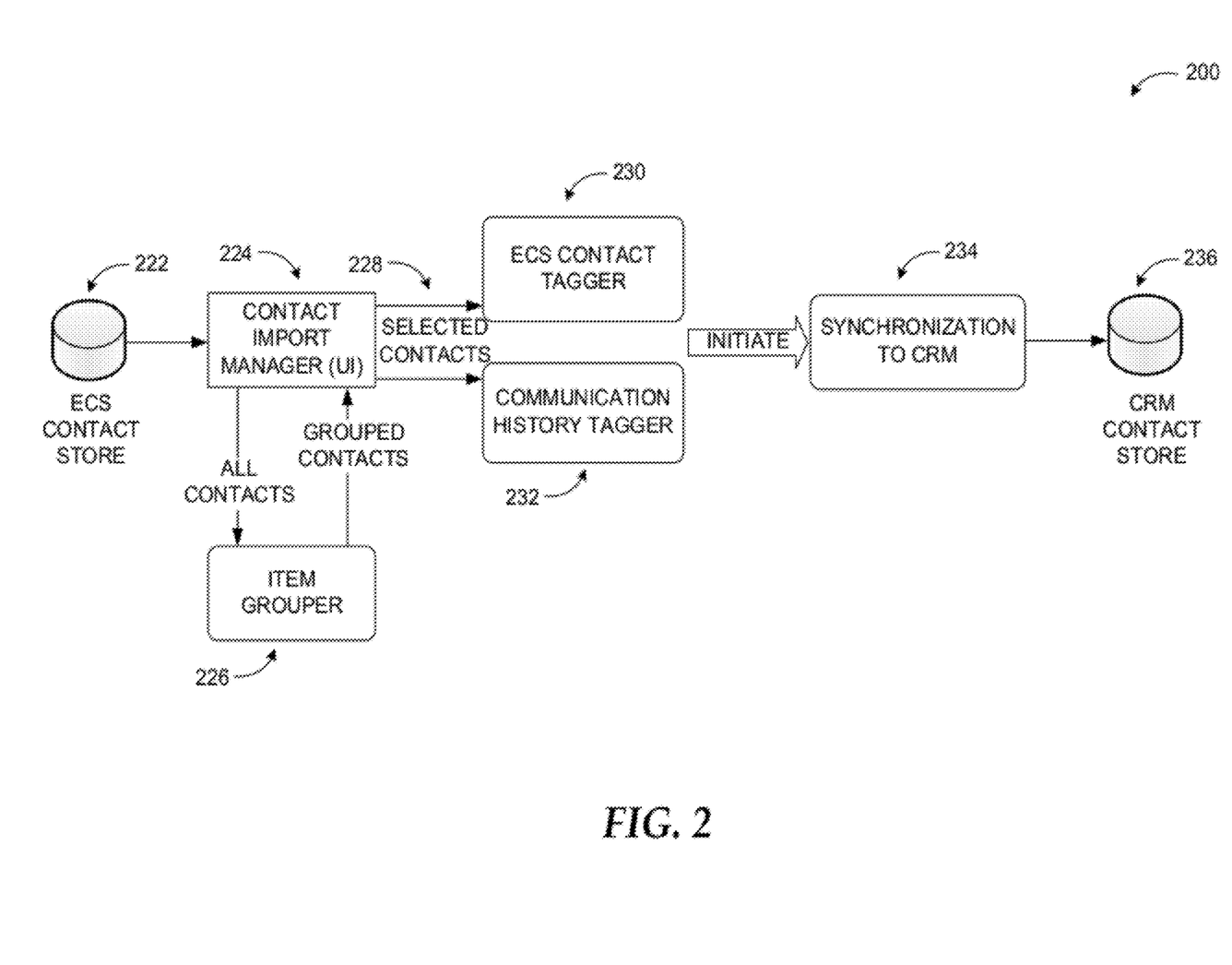
FIG. 2 illustrates example actions and components in import of contact information from an ECS platform to a CRM platform based on grouping of contacts.

FIG. 2 illustrates example actions and components in import of contact information from an ECS platform to a CRM platform based on grouping of contacts. As shown in diagram 200, a contact import manager module 224 may retrieve contact data from ECS contact store 222. The module may analyze the contacts through an item grouper process 226 and present grouped contacts to a user through its user interface. For example, if a user's contacts in the ECS application are organized, the module may determine which folders contain business contacts (or based on categories assigned to contacts). The module may also arrange the contact according to email domains, categories, organizations, and similar attributes associated with each contact.

The grouped and arranged contacts are then presented to the user such that the user can select groups of contacts based on the arrangement to be imported to the CRM contact store 236. An ECS contact tagger process 230 may tag the contacts to be imported based on the group selections. If the user indicates that communication history should be included along with the basic contact information, a communication history tagger process 232 may tag any data (e.g., emails, tasks, appointments, faxes, and similar records) associated with selected contacts. The tagged data through both processes may then be provided to CRM contact store 236 through a synchronization process 234. The synchronization process may ensure bidirectional synchronization such that records on both sides (ECS and CRM) match and duplicate records are eliminated.

If communication history is to be included, enhanced search capabilities of the ECS application may be utilized to find records. For example, some ECS applications may index data such as meetings, emails, and similar data for efficient search. In determining communication history data for a contact, the contact import manager module 224 may initiate a search at the ECS application and tag the search results in a search folder of the ECS application.

When the import is completed, feedback may be provided to the user in form of statistics or similar information. The imported information may be structured hierarchically on the CRM side according to a data structure of the CRM application that is inherent to each business (e.g. an account structure). The contact import manager module 224 may be launched from a browser application, from within a user interface of the CRM application, or directly (i.e., it may be an independent module with its own user interface).

The examples in FIGS. 1 and 2 have been described with specific configurations and components. Embodiments are not limited to systems according to these example configurations and components. Automatic creation of data hierarchy in CRM systems based on imported contact data may be implemented in configurations using other types of components, processes, and configurations in a similar manner using the principles described herein.

Figure 3:
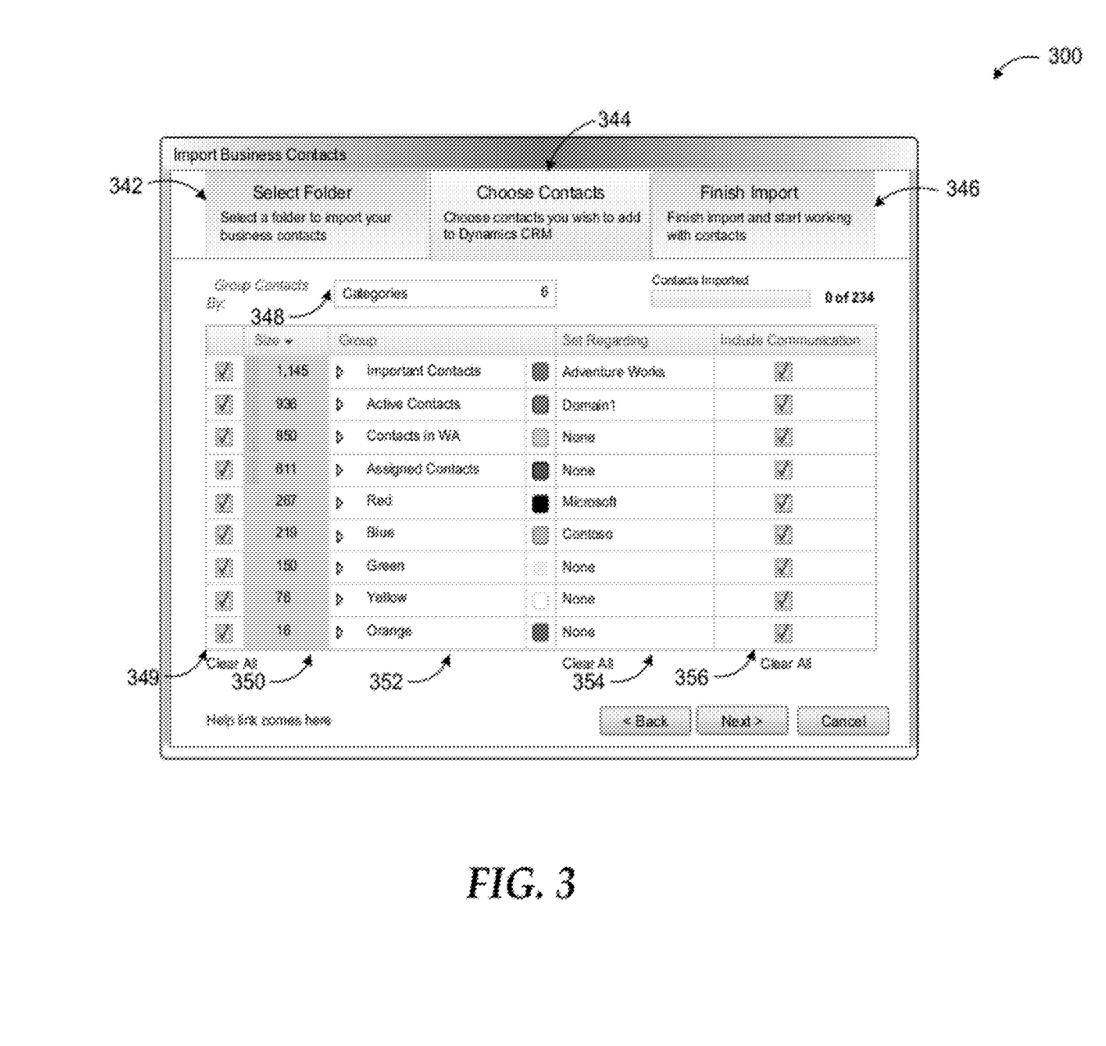
FIG. 3 illustrates a screenshot of an example import module user interface for enabling a user to specify contact groupings and other attributes associated with the import process.

FIG. 3 illustrates a screenshot of an example import module user interface for enabling a user to specify contact groupings and other attributes associated with the import process. Import module user interface may present the tasks associated with importing contact data to a CRM application in three main views. In a first view selectable by tab 342, the user may be presented with a list of folders to select from in the ECS application if the contacts in the ECS application are organized according to folders. A second view shown in FIG. 3 under tab 344 may enable the user to select groups of contacts and indicate whether or not communication history data should also be imported. A third view selectable by tab 346 may provide feedback on completed import operations.

As discussed above, the import module may analyze contacts in the ECS application and group them based on attributes such as categories, email domains, organizations, and comparable ones. The grouping criterion may be presented in a drop-down menu 348 such that the user is enabled to select a different grouping criterion. The groups of contacts may be presented in column 352 with descriptors indicating what the group was based on. In case of categories, a graphical element (e.g., a colored box or circle, an icon, etc.) may also be used. Further explanation on the groups may be presented in column 354. For example, a group based on a red category may include contacts that belong to a particular organization (e.g., company) or another group may include contacts with a particular email domain.

Column 350 may display a size (a number of contacts) for each listed group. Column 349 may include selection controls such as check boxes to enable the user to select of unselect one or more of the presented groups. Similarly, column 356 may be used to enable the user to indicate whether communication history should also be imported for a particular group. The presentation of the import process choices and progress may include textual, graphical, color, shading, and other schemes. Furthermore, the suggested groups and associated information may be presented in ways other than column format. For example, icons or similar graphical elements may be used to represent groups in a less structured presentation. The user interface may be presented as an independent user interface or an integrated part of a CRM user interface (e.g. within the CRM application user interface or within a browser page associated with the CRM application).

Figure 4:
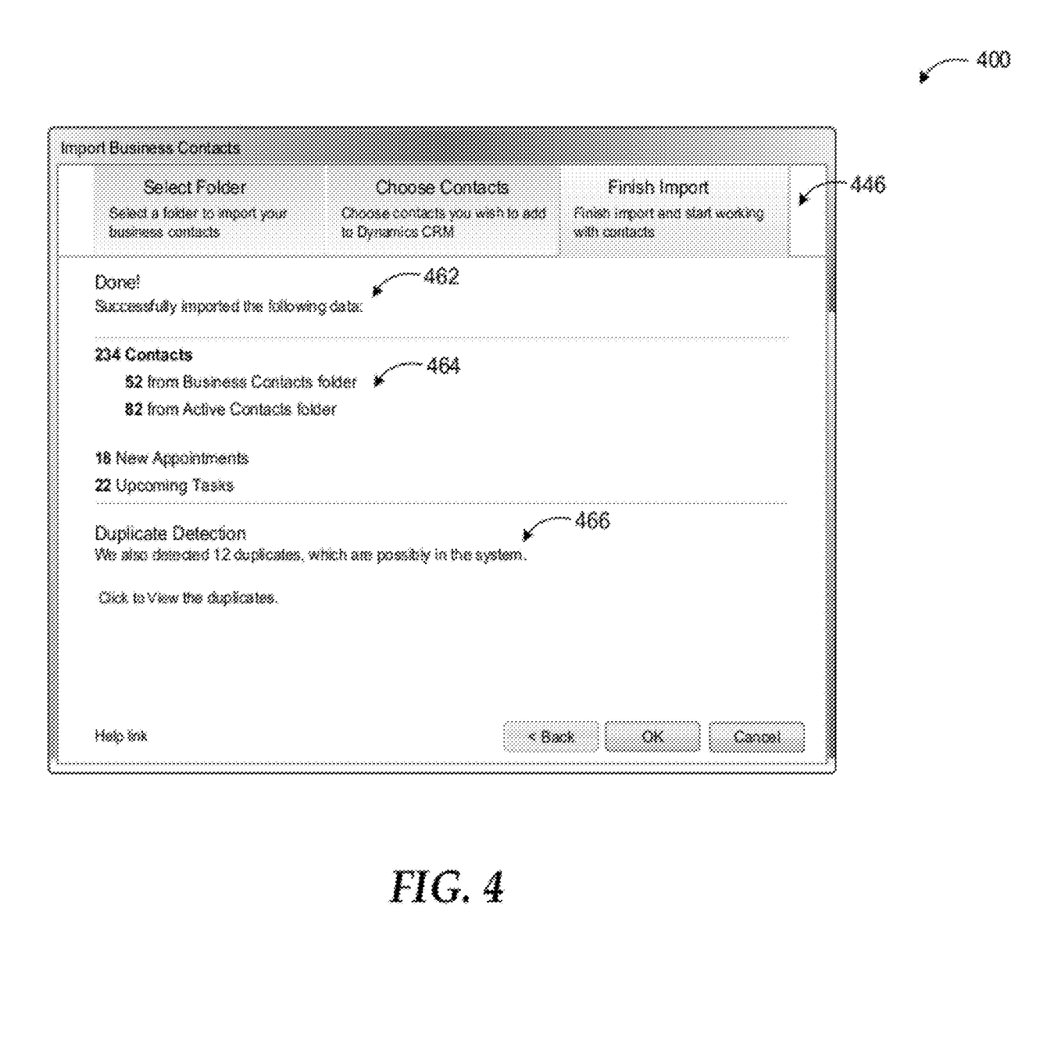
FIG. 4 illustrates another screenshot of an example import module user interface providing feedback upon completion of the import process.

FIG. 4 illustrates another screenshot of an example import module user interface providing feedback upon completion of the import process. Import module user interface 400 displays information associated with progress or completion of the import operations under tab 446. A status indicator 462 provides feedback on the progress (e.g., import completed). A summary information section 464 may display the number of contacts and associated data that has been imported. Moreover, additional information such as duplicate detection information 466 may also be displayed to the user.

As in FIG. 3, various textual, graphical, color, and shading schemes may be employed to enhance the presentation of the information on import module user interface 400. Furthermore, some or all of the information presented may be made actionable. For example, summary information on imported data may include links that may open the CRM application's relevant user interfaces to view or edit the imported data.

The import process may be triggered when a user marks an item for synchronization or alters an ECS contact. Import may also be triggered in response to the user manually initiating ECS synchronization with CRM or a background operation beginning on a periodic basis.

Import module user interfaces 300 and 400 are intended to be illustrative examples of how information and options associated with the import process may be provided to a user. Embodiments are not limited to the textual or graphical elements and configurations shown on the screenshots. An import module user interface according to embodiments may include additional or fewer elements with other configurations.

Figure 5:
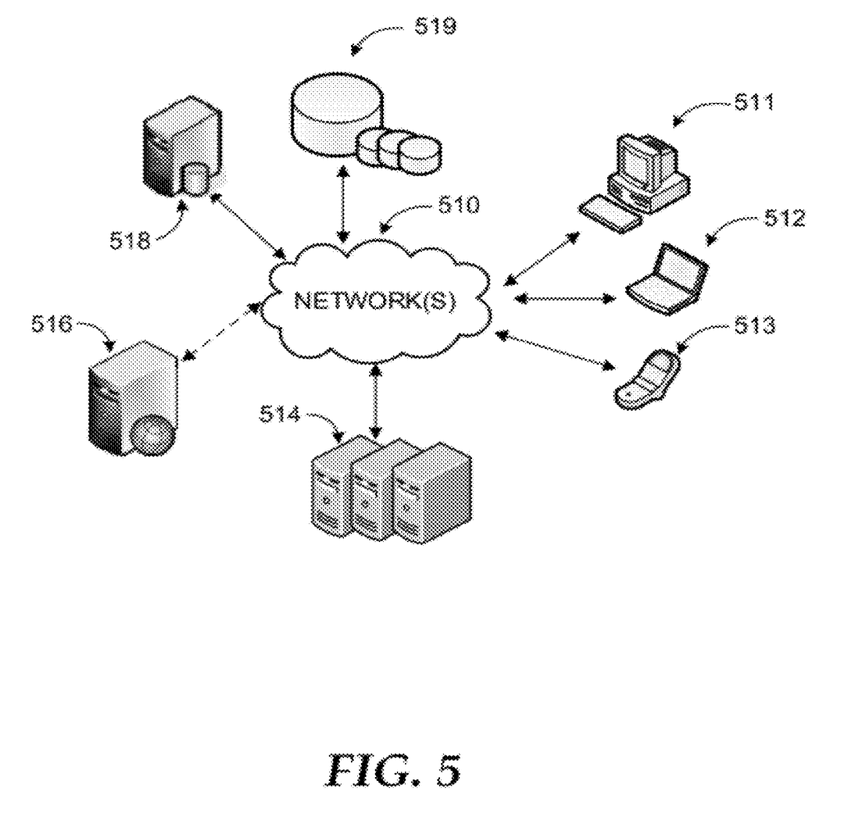
FIG. 5 is a networked environment, where a system according to embodiments may be implemented.

FIG. 5 is an example networked environment, where embodiments may be implemented. A system for importing contact information to CRM applications from ECS applications may be implemented via software executed over one or more servers 514 such as a hosted service. The platform may communicate with client applications on individual computing devices such as a smart phone 513, a laptop computer 512, or desktop computer 511 (client devices') through network(s) 510.

Client applications executed on any of the client devices 511-513 may facilitate communications with an ECS application executed on one or more of servers 514 and a CRM application executed on server 516. An import module executed in conjunction with the CRM application may facilitate importing of various contact information and optionally associated communication history data maintained by the ECS application to the CRM application as discussed previously. The CRM and/or ECS applications may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing contact data import between ECS and CRM applications. Furthermore, the networked environments discussed in FIG. 5 are for illustration purposes only. Embodiments are not limited to the example applications, modules, or processes.

Figure 6:
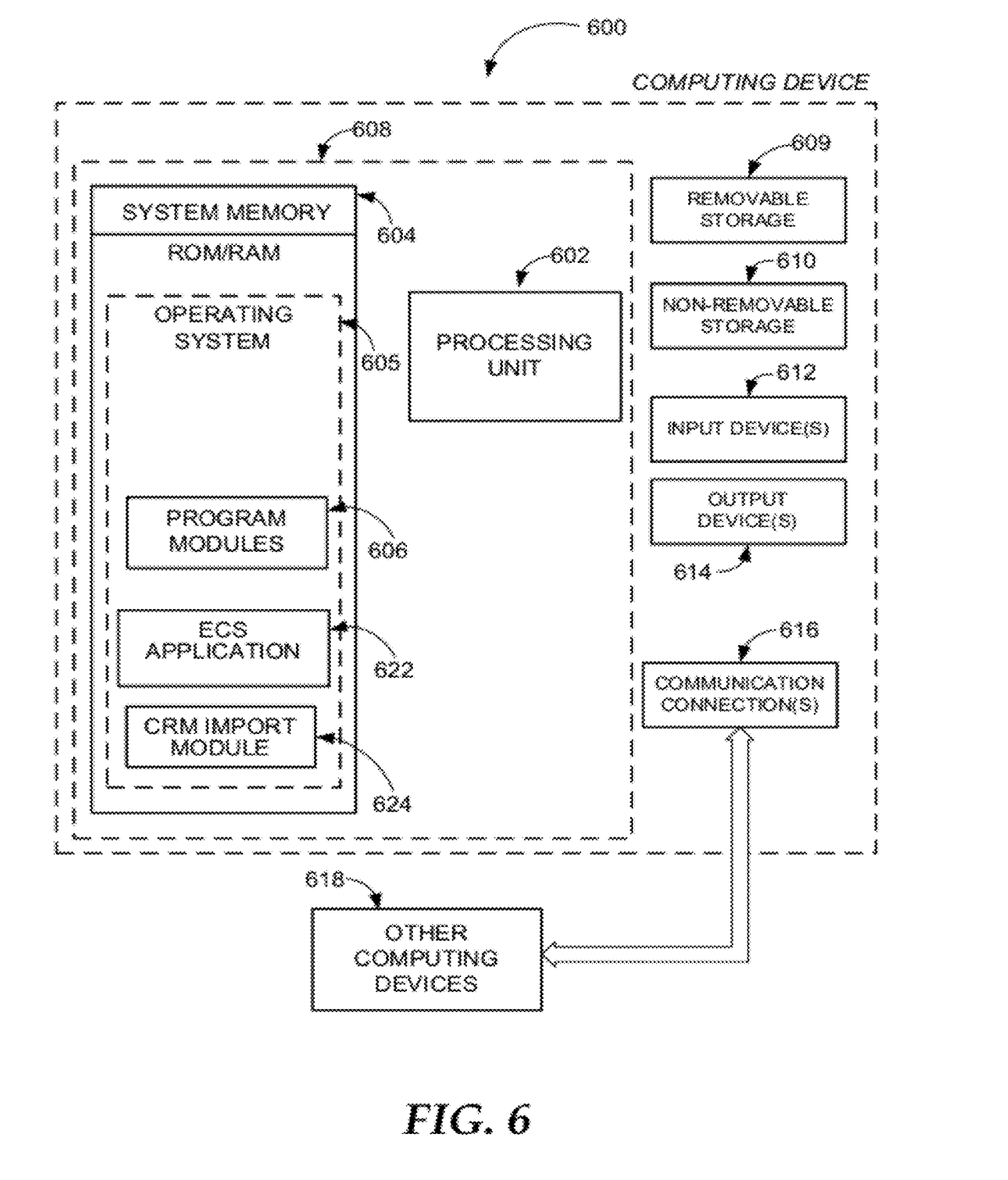
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application capable of providing email, contact management, scheduling, and similar services, as well as access to a CRM application according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, ECS application 622, and synchronization module 624.

ECS application 622 may provide email, scheduling, contact management, and comparable services in conjunction with a hosted service. CRM import module 624 may enable import of contact data and associated communication history data from the ECS application 622 to a CRM application creating hierarchical structures automatically on the CRM side. CRM import module 624 may be a separate application or an integrated module of a hosted CRM service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
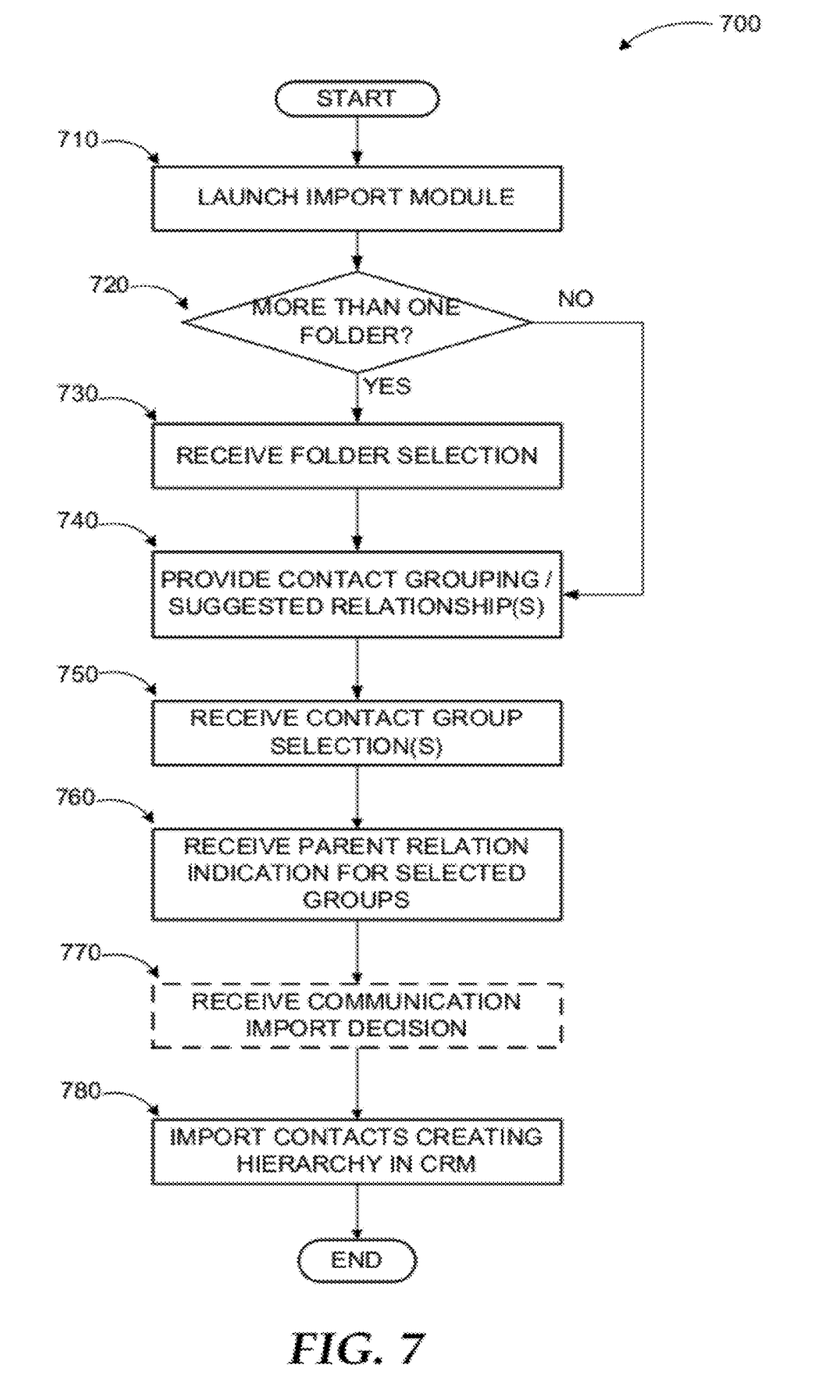
FIG. 7 illustrates a logic flow diagram for a process of importing ECS contact information to a CRM platform according to embodiments.

FIG. 7 illustrates a logic flow diagram for process 700 of importing contact data from an ECS application to a CRM application according to embodiments. Process 700 may be implemented on a client device.

Process 700 begins with operation 710, where the import module is launched from within a CRM user interface or a browser providing access to the CRM service. If the contact data in the ECS application is organized in folders as determined in decision operation 720, the user may be presented with a list of the folders and a user selection of folders received at operation 730. If the contacts in the ECS application are not organized in folders or upon receiving the folder selection, the import module may analyze the contacts and present grouping based on criteria such as categories, email domains, organizations, and similar attributes at operation 740. At the same operation suggested relationships for associating the groups may also be provided.

Upon receiving contact group selections at operation 750 and parent account indication for selected groups at operation 760, the import module may receive optionally an indication whether communication history is to be imported as well at operation 770. If the communication history is to be imported, search capabilities of the ECS application may be taken advantage of in finding emails, faxes, letters, tasks, appointments, meetings, and similar information associated with the contact to be imported. At operation 780, the contacts tagged in the group selection process and optionally the communication data tagged in the communication history search process may be imported into the CRM application creating hierarchical structure for the imported data based on the data structure of the CRM system.

The operations included in process 700 are for illustration purposes. Bidirectional synchronization between ECS and CRM applications may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for automated importing of contact information from an email, contact management, scheduling (ECS) application to a customer relationship management (CRM) application, the method comprising:
    analyzing contacts in the ECS application at a CRM import module;
    presenting a plurality of contact groupings for selection to be imported;
    receiving contact grouping selection;
    presenting one or more tasks associated with importing contact data and communication history data to the CRM application in at least two distinct views on a CRM import module user interface for enabling a user to select one or more of: contacts, folders, groups, and the communication history data for importing to the CRM application; and
    importing the contact data for the contacts included in the selected groupings and the communication history data associated with the contact data from an ECS contact store associated with the ECS application to the CRM application by automatically creating hierarchical relationships based on a data structure of the CRM application.

2. The method of claim 1, further comprising:
    determining whether the contacts are organized in two or more folders by the ECS application; and
    if the contacts are organized in two or more folders:
        presenting available folders;
        receiving a folder selection; and
        forming the contact groupings based on the folder selection.

3. The method of claim 1, further comprising:
presenting suggested relationships for each of the contact groupings;
receiving a selection of parent accounts based on the suggested relationships; and
creating the hierarchical relationships based on the selected parent relationships.

4. The method of claim 1, further comprising:
receiving an indication for the communication history data to be included in imported data;
tagging the communication history data at the ECS application based on a search capability of the ECS application; and
importing the communication history data to the CRM application to be included in the hierarchical relationships along with the contacts.

5. The method of claim 4, wherein the communication history data includes at least one from a set of: an email, a task, an appointment, a meeting, a phone call record, a fax, and a letter.

6. The method of claim 1, further comprising:
mapping data fields associated with each contact to data fields at the CRM application based on one of: a default rule, a predefined rule, and a user defined rule.

7. The method of claim 1, wherein the contact groupings are formed based on one of: an ECS category assigned to each contact, an email domain associated with each contact, and an organization associated with each contact.

8. The method of claim 7, further comprising:
enabling the user to add a new category for the contact groupings.

9. The method of claim 1, wherein import process is performed in response to one of expiration of a predefined period and a user demand.

10. The method of claim 1, wherein the import module is launched from one of a CRM client application and a browser enabling access to the CRM application.

11. A computing device for facilitating access to email, contact management, scheduling (ECS) and customer relationship management (CRM) services, the computing device comprising:
a memory;
a processor coupled to the memory, the processor executing an ECS application and a CRM import module, the CRM import module configured to:
analyze contacts in the ECS application;
present a plurality of contact groupings for selection to be imported;
present suggested relationships for each of the contact groupings;
present one or more tasks associated with importing contact data and communication history data to the CRM application in at least two distinct views on a CRM import module user interface for enabling a user to select one or more of: contacts, folders, relationships, groups, and the communication history data for importing to the CRM application;
receive at least one of a contact grouping selection and a relationship selection;
retrieve the contact data for the contacts included in the selected groupings and the communication history data associated with the contact data from an ECS contact store associated with the ECS application; and
import the contact data and the communication history data for the contacts in the selected groupings to the CRM application by automatically creating hierarchical relationships based on a data structure of the CRM application and the relationship selection.

12. The computing device of claim 11, wherein the CRM module executes:
an item grouper process configured to analyze the contacts in the ECS application and form the plurality of grouping based on a default attribute;
an ECS contact tagger process configured to tag ECS contacts to be imported; and
a communication history tagger configured to:
receive an indication for the communication history data to be included in imported data; and
tag the communication history data in the ECS application based on a search capability of the ECS application, wherein the communication history data includes at least one from a set of: an email, a task, an appointment, a meeting, a phone call record, a fax, and a letter.

13. The computing device of claim 11, wherein the import module is further configured to import the contacts and the communication history data employing a synchronization process executed by the ECS application to synchronize the ECS application and the CRM application.

14. The computing device of claim 11, wherein the import module is further configured to:
present summary feedback information on progress of import process and duplicate record detection during and following completion of the import process.

15. The computing device of claim 14, wherein at least a portion of the presented feedback information is actionable enabling a user to one of view and edit imported contacts at the CRM application.

16. The computing device of claim 11, wherein the import module is one of: an independent application and an integrated module of a CRM client application.

17. A computer-readable memory device with instructions stored thereon for automated importing of contact information from an email, contact management, scheduling (ECS) application to a customer relationship management (CRM) application, the instructions comprising:
analyzing contacts in the ECS application at a CRM import module;
determining whether the contacts are organized in two or more folders by the ECS application;
if the contacts are organized in two or more folders:
presenting available folders;
receiving a folder selection; and
forming the contact groupings based on the folder selection;
presenting a plurality of contact groupings based on at least one attribute of the contacts for selection to be imported;
presenting one or more tasks associated with importing contact data and communication history data to the CRM application in at least two distinct views on a CRM import module user interface for enabling a user to select one or more of: contacts, folders, relationships, groups, and the communication history data for importing to the CRM application;
receiving a contact grouping selection and a relationship selection;
receiving an indication for the communication history to be included in imported data;
tagging the communication history data at the ECS application based on a search capability of the ECS application;
retrieving the contact data for the contacts included in the selected groupings and the communication history data associated with the contact data from an ECS contact store associated with the ECS application;

importing the contact data and the communication history data for the contacts included in the selected groups and the tagged communication history data to the CRM application by automatically creating hierarchical relationships based on an account structure of the CRM application.

18. The computer-readable memory device of claim 17, wherein the instructions further comprise:

presenting the plurality of contact groupings, a size of each grouping, a suggested account for each grouping, and controls for selecting the groupings as columns on the import module user interface.

19. The computer-readable memory device of claim 18, wherein the import module user interface employs at least one from a set of: a textual scheme, a graphical scheme, a color scheme, and a shading scheme.

20. The computer-readable memory device of claim 18, wherein the import module user interface further provides statistical feedback associated with the import process comprising at least one from a set of: a number of imported contacts, a source folder associated with the imported contacts, a number and type of imported communication history data, and a number of detected duplicates.

* * * * *